United States Patent [19]

Sugiyama et al.

[11] Patent Number: 4,660,100
[45] Date of Patent: Apr. 21, 1987

[54] ROTARY RECORDING MEDIUM REPRODUCING APPARATUS FOR REPRODUCING PRE-RECORDED SIGNALS FROM A ROTARY RECORDING MEDIUM HAVING TRACK TURNS RECORDED WITH DIGITAL SIGNAL AND TRACK TURNS RECORDED WITH ANALOG SIGNAL

[75] Inventors: Hiroyuki Sugiyama, Isehara; Nobuaki Takahashi, Yamato; Takeshi Shibamoto, Sagamihara; Kazunori Nishikawa, Machida; Makoto Komura, Tokyo, all of Japan

[73] Assignee: Victor Company of Japan, Ltd., Yokohama, Japan

[21] Appl. No.: 609,237

[22] Filed: May 11, 1984

[30] Foreign Application Priority Data

May 12, 1983 [JP] Japan ............................ 58-83233
May 12, 1983 [JP] Japan ............................ 58-83235

[51] Int. Cl.⁴ .............................................. H04N 5/76
[52] U.S. Cl. ...................................... 358/342; 360/48; 369/59
[58] Field of Search .................. 358/341, 342, 343; 360/19.1, 39, 48, 53; 369/59, 72.1, 72.2

[56] References Cited

U.S. PATENT DOCUMENTS 4,476,499 10/1984 Kanamaru et al. ................ 358/342
4,513,327 4/1985 Takahashi et al. .................. 358/310

Primary Examiner—Robert L. Richardson
Attorney, Agent, or Firm—Michael N. Meller

[57] ABSTRACT

A rotary recording medium reproducing apparatus comprises a reproducing circuit for picking up and reproducing pre-recorded signals from a rotary recording medium on which digital recorded tracks and analog recorded tracks coexist, a first reproducing circuit for reproducing a composite video signal having a horizontal scanning frequency of a predetermined television system from signals which are reproduced from the analog recorded tracks, among reproduced signals from the reproducing circuit, a second reproducing circuit for demodulating and reproducing original information signals from signals which are reproduced from the digital recorded tracks, among the reproduced signals from the reproducing circuit, an oscillator circuit for generating a signal having a frequency which is a natural number multiple of the horizontal scanning frequency of the predetermined television system, a servo circuit for rotating a motor which rotates the rotary recording medium, in synchronism with the output signal of the oscillator circuit, and a master clock signal generating circuit for supplying to the second reproducing circuit a signal which is obtained by frequency-multiplying the output signal of the oscillator circuit, as a master clock signal.

8 Claims, 13 Drawing Figures

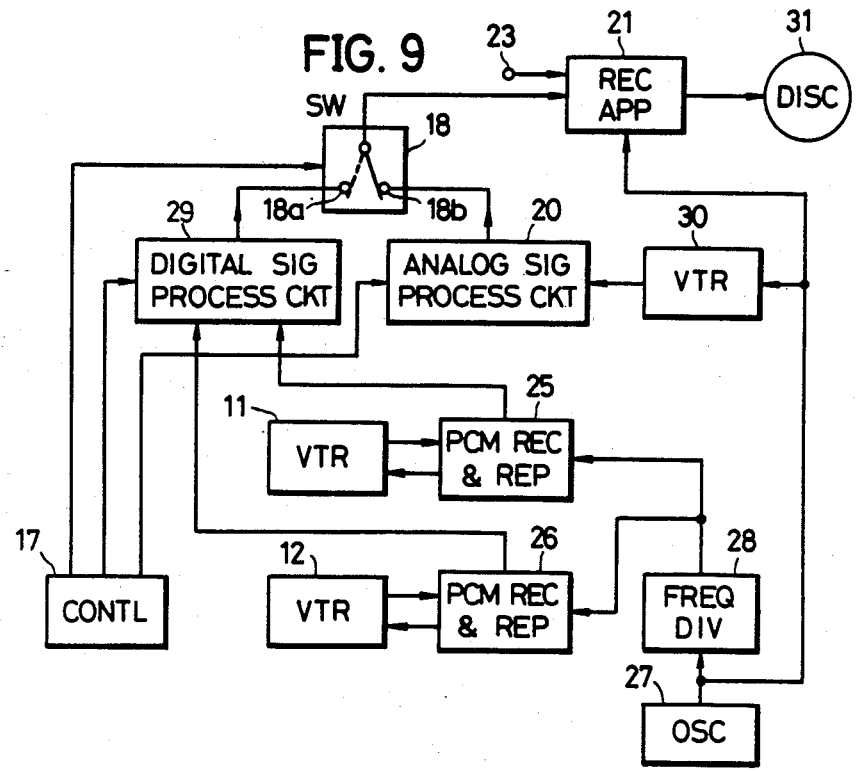

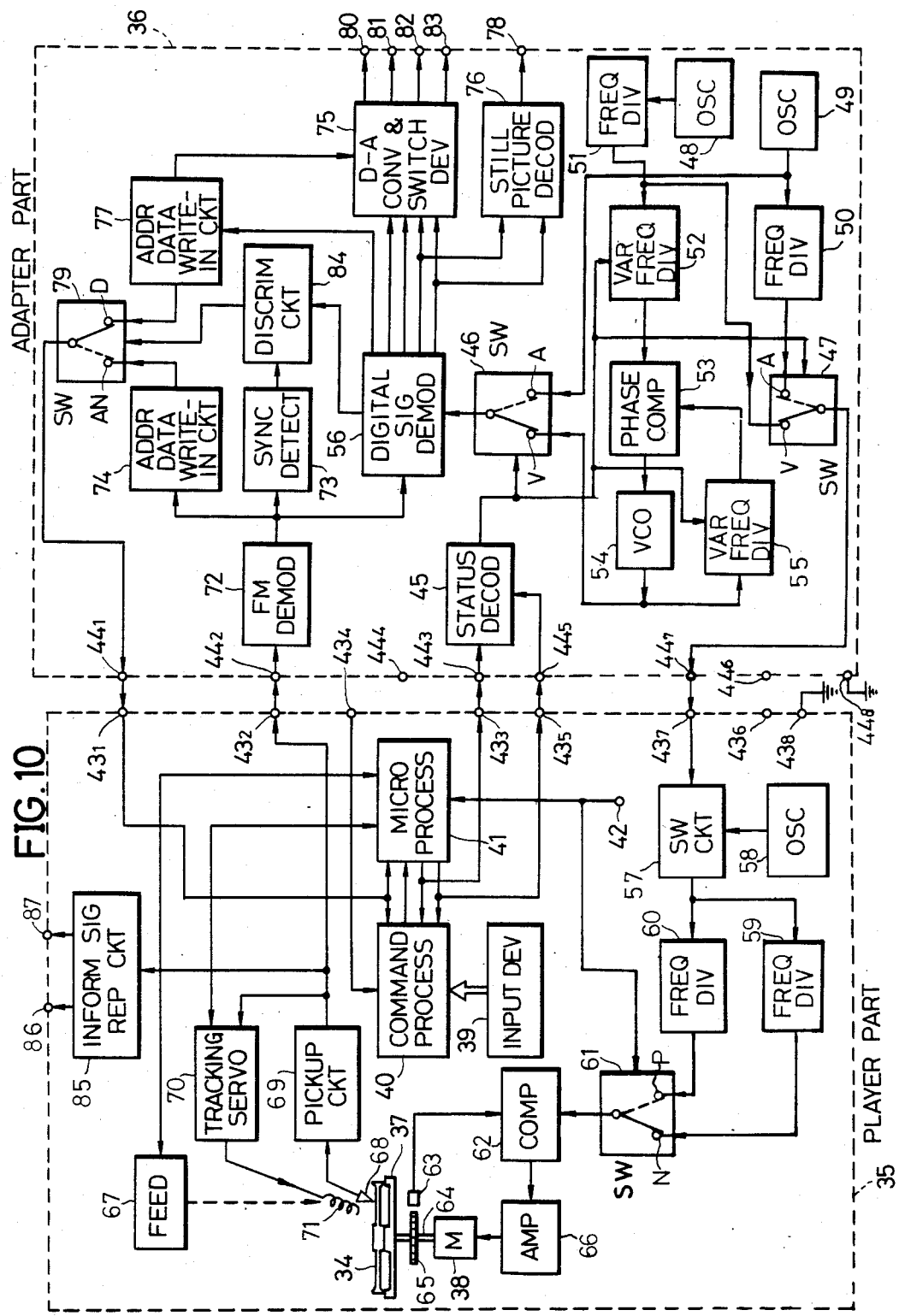

FIG. 12

| | FIRST BYTE | | | | | SECOND BYTE | |
|---|---|---|---|---|---|---|---|
| | LID PLATE | | | DATA REQUEST | DISC MODE | REPRODUCTION MODE | CARRIAGE POSITION |
| 0 | FIRST SIDE | DIGITAL AUDIO DISC | PAL | 00 CHAPTER | STILL PIC-TURE DISC REP MODE | 0 NORMAL SPEED | |
| | | | | 01 TIME | | 1 STOP CODE | |
| 1 | SECOND SIDE | VIDEO DISC | INTER-ACTIVE | 10 TRACK | STILL PICT DISC NON-REP MODE | 2 | LEAD-OUT |
| | | | NTSC | 11 OFF | STOP CODE REP MODE | 3 | NORMAL REPRODUCTION |
| | | | | 10 PROG B Ⓥ | STOP CODE NON-NON-REP MODE | 4 STILL | LEAD-IN |
| | | | | 11 PROG A Ⓐ | | 5 PAUSE | TO LEAD-IN POSITION |
| | | | | | | 6 | TO REST POSITION |
| | | | | | | 7 | |
| | | | | | | 8 FAST BWD | |
| | | | | | | 9 SLOW BWD | |
| | | | | | | A FAST FWD | |
| | | | | | | B SLOW FWD | |
| | | | | | | C SEARCH | |
| | | | | | | D NO TARGET ADDR | OPERATE ENLA-RGING MECH |
| | | | | | | E TARGET ADDR REPRODUCED | RAISE LIFTER |
| | | | | | | F NOTHING REPRODUCED | LOWER LIFTER |

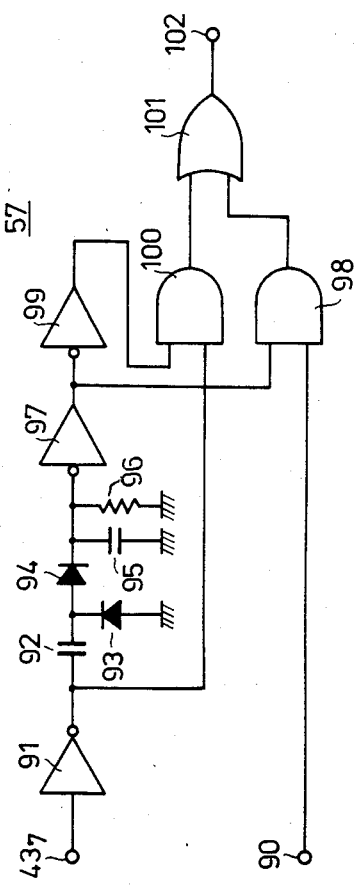

FIG. 13

ROTARY RECORDING MEDIUM REPRODUCING APPARATUS FOR REPRODUCING PRE-RECORDED SIGNALS FROM A ROTARY RECORDING MEDIUM HAVING TRACK TURNS RECORDED WITH DIGITAL SIGNAL AND TRACK TURNS RECORDED WITH ANALOG SIGNAL

BACKGROUND OF THE INVENTION

The present invention generally relates to rotary recording medium reproducing apparatuses, and more particularly to a reproducing apparatus which is designed to satisfactorily reproduce recorded signals from a single continuous spiral track on the same side of a rotary recording medium, at the same rotational speed with respect to digital recorded tracks and analog recorded tracks which constitute the spiral track and coexist on the same side of the rotary recording medium, where the digital recorded tracks are recorded with digitally modulated information signals and the analog recorded tracks are recorded with analog modulated information signals.

There is a known type of a rotary recording medium (hereinafter simply referred to as a disc) which is recorded with analog information signals such as a composite video signal and audio signals. In such a disc, the analog information signals are subjected to a frequency modulation, for example, and are recorded on a spiral track or concentric tracks on the disc as variations in geometrical configuration, for example. This disc is often referred to as a video disc because the recorded information mainly includes the composite video signal. The composite video signal or the like is recorded on the tracks on the video disc in the form of modulated signals which are obtained by modulating a carrier by the analog information signals. An address signal which is used for random access and the like, is recorded within a predetermined duration within a vertical blanking period of the composite video signal, for example. The address signal itself is an encoded digital signal, however, the main information recorded on the video disc is the analog modulated composite video signal or the like. Hence, in the present specification, tracks such as the recorded tracks of this video disc, will be referred to as "analog recorded tracks" for convenience' sake.

On the other hand, there is another type of a disc which is recorded with digital signals. In such a disc, audio signals or audio and video signals are subjected to a digital modulation, and are time-sequentially multiplexed and recorded on concentric tracks or a spiral track on the disc as variations in geometrical configuration, for example. This disc is often referred to as a digital audio disc because the recorded information mainly includes the audio signals, and the video signal mainly relates to a still picture and is simply recorded as a supplementary information to help the listener with his imagination. The audio signals or the audio and video signals are recorded on the tracks on the digital audio disc after being converted into the form of digital signals which are obtained by subjecting the audio signals or the audio and video signals to a digital modulation and then subjecting the digital modulated signals to a frequency modulation or the like. In the present specification, tracks such as the recorded tracks of this digital audio disc, will be referred to as "digital recorded tracks" for convenience' sake.

In an electrostatic capacitance type video disc proposed in a U.S. Pat. No. 4,331,976, the recorded signals are reproduced from the video disc by detecting the variations in the electrostatic capacitance which is formed between the video disc and an electrode of a reproducing stylus. Reference signals for tracking control, are recorded on both sides of the information signal recorded track (analog recorded track) According to this video disc, the need for a stylus guide groove was eliminated by use of the reference signals, is known. In this known video disc, a tracking control was carried out with respect to the reproducing stylus so that the reproducing stylus accurately scans over the information recorded track during the reproduction mode, by comparing the levels of the reference signals which are reproduced from the video disc.

On the other hand, an electrostatic capacitance type digital audio disc is also known. The electrostatic capacitance type digital audio disc has no stylus guide groove and is recorded with reference signals for tracking control on both sides of the information signal recorded track (digital recorded track), similarly as in the case of the electrostatic capacitance type video disc. During the reproducing mode, this electrostatic capacitance type digital audio disc is rotated at a predetermined rotational speed which is the same as the rotational speed of the electrostatic capacitance type video disc. The frequencies of the reference signals and the method of reproducing the reference signals, are the same between the electrostatic capacitance type digital audio disc and the electrostatic capacitance type video disc. Further, in both the electrostatic capacitance type digital audio disc and the electrostatic capacitance type video disc, the recorded signals are reproduced from the disc by detecting the variations in the electrostatic capacitance between the disc and the electrode of the reproducing stylus. For these reasons, even when the digital audio disc is played on a video disc reproducing apparatus which is designed to play the video disc, the tracking control is carried out with respect to the reproducing stylus similarly as in the case where the video disc is played, and the recorded signals can be picked up and reproduced from the digital audio disc by the reproducing stylus. The signals which are reproduced from the digital audio disc, are demodulated into original audio signals or the like in an adapter which is coupled to the video disc reproducing apparatus.

Accordingly, the previously proposed electrostatic capacitance type video disc and the electrostatic capacitance type digital audio disc can be played on the same electrostatic capacitance type video disc reproducing apparatus. In other words, the above video disc and the digital audio disc can be played compatibly on the same video disc reproducing apparatus.

However, the digital audio disc and the video disc were mutually independent discs, and the compatibility did not exist in the true sense of the word. On the other hand, the digital audio disc is recorded with digital signals. Thus, compared to the video disc, the audio signals are reproduced from the digital audio disc with a wide dynamic range and with an extremely high fidelity, due to the characteristics of the digital signal transmission. Moreover, the still picture which is reproduced from the digital audio disc is extremely sharp, and there is of course an advantage in that the audio signals are reproduced from the digital audio disc with an extremely high fidelity together with the still picture. On the other hand, the still picture is reproduced from the video disc by repeatedly reproducing the same track on the video disc. Generally, the audio signals are muted during the still picture reproduction, and it is impossible to simultaneously reproduce the audio signals and the video signal from the video disc. However, due to the analog signal transmission in the video disc, it is possible to transmit the information signals in real time with a frequency band in the range of several MHz according to the video disc. Thus, compared to the digital audio disc in which the information signals are transmitted with a frequency band in the range of several tens of kHz in order to improve the transmitting accuracy, the video disc is advantageous in that it is possible to simultaneously reproduce a moving picture and the audio signals. Accordingly, in order to ensure optimum reproduction of the recorded signals, it is desirable to select and reproduce one of the digital signals and the analog signals depending on the information contents.

SUMMARY OF THE INVENTION

Accordingly, it is a general object of the present invention to provide a novel and useful disc reproducing apparatus in which the problems described heretofore have been eliminated.

Another and more specific object of the present invention is to provide a disc reproducing apparatus which is designed to satisfactorily reproduce pre-recorded signals from a single continuous spiral track on the same side of a disc, at the same rotational speed with respect to digital recorded tracks and analog recorded tracks which constitute the spiral track and coexist on the same side of the disc, where the digital recorded tracks are recorded with digitally modulated information signals which have been subjected to a further modulation and the analog recorded tracks are recorded with analog modulated information signals including a composite video signal. The disc reproducing apparatus according to the present invention comprises a first reproducing circuit for reproducing a composite video signal from the signal which is reproduced from the analog recorded tracks, a second reproducing circuit for demodulating and reproducing the signal which is reproduced from the digital recorded tracks into the original information signal, and a circuit for supplying a master clock signal to the second reproducing circuit.

According to the apparatus of the present invention, the recorded tracks can be reproduced satisfactorily regardless of whether the recorded tracks are the digital recorded tracks or the analog recorded tracks, and a perfect compatible reproduction can be achieved. Especially from the analog recorded tracks, it is possible to reproduce a video information related to a moving picture together with an audio information. Further, from the digital recorded tracks, it is possible to reproduce a video information related to a still picture which is extremely sharp compared to the still picture information reproduced from the conventional video disc, together with an audio information. In addition, from the digital recorded tracks, it is possible to reproduce an audio information with a wide dynamic range and with an extremely high fidelity compared to the audio information reproduced from the conventional video disc. In other words, it is possible to reproduce audio and video information from the disc with an improved artistic touch, compared to the conventional video disc and the conventional digital audio disc.

Still another object of the present invention is to provide a disc reproducing apparatus comprising first and second switching circuit means. The first switching circuit means selectively produces an output signal of a first oscillator circuit as an external synchronizing signal for a disc rotating motor when reproducing pre-recorded signals from a first disc on which the analog recorded tracks and the digital recorded tracks coexist or the conventional video disc (second disc), and selectively produces a signal which is obtained by frequency-dividing an output signal of a second oscillator circuit as the external synchronizing signal when reproducing pre-recorded signals from the conventional digital audio disc (third disc). The second switching circuit means selectively produces a signal which is obtained by frequency-multiplying the output signal of the first oscillator circuit as a master clock signal for the second reproducing circuit which demodulates and reproduces the original information signal from the signal which is reproduced from the digital recorded tracks, when reproducing the pre-recorded signals from the first disc. The second switching circuit means selectively produces the output signal of the second oscillator means as the master clock signal when reproducing the pre-recorded signals from the third disc. According to the apparatus of the present invention, it is possible to compatibly reproduce the pre-recorded signals from the first, second, and third discs.

A further object of the present invention is to provide a disc reproducing apparatus in which the rotational speed of the disc is controlled according to the number of scanning lines employed in the composite video signal which is pre-recorded on the analog recorded tracks, so that the frequency of the reproduced horizontal synchronizing signal becomes a constant frequency. According to the apparatus of the present invention, it is possible to reproduce and display the composite video signal regardless of the number of scanning lines employed in the composite video signal which is pre-recorded on the analog recorded tracks. In addition, it is possible to reproduce audio signals from the digital recorded tracks with a high quality and a high fidelity, and also satisfactorily reproduce a video signal (especially related to a still picture) from the digital recorded tracks.

Other objects and further features of the present invention will be apparent from the following detailed description when read in conjunction with the accompanying drawings.

BRIEF DESCRIPTION OF THE DRAWINGS

FIG. 9 is a systematic block diagram showing another example of a recording system for recording the disc which is to be played;

FIG. 10 is a systematic block diagram showing an embodiment of a disc reproducing apparatus according to the present invention;

FIG. 12 shows an example of a format of an essential part of a status signal which is serially produced from a microprocessor within the block system shown in FIG. 10; and FIG. 13 is a circuit diagram showing an embodiment of a switching circuit within the block system shown in FIG. 10.

DETAILED DESCRIPTION

Figure 1:
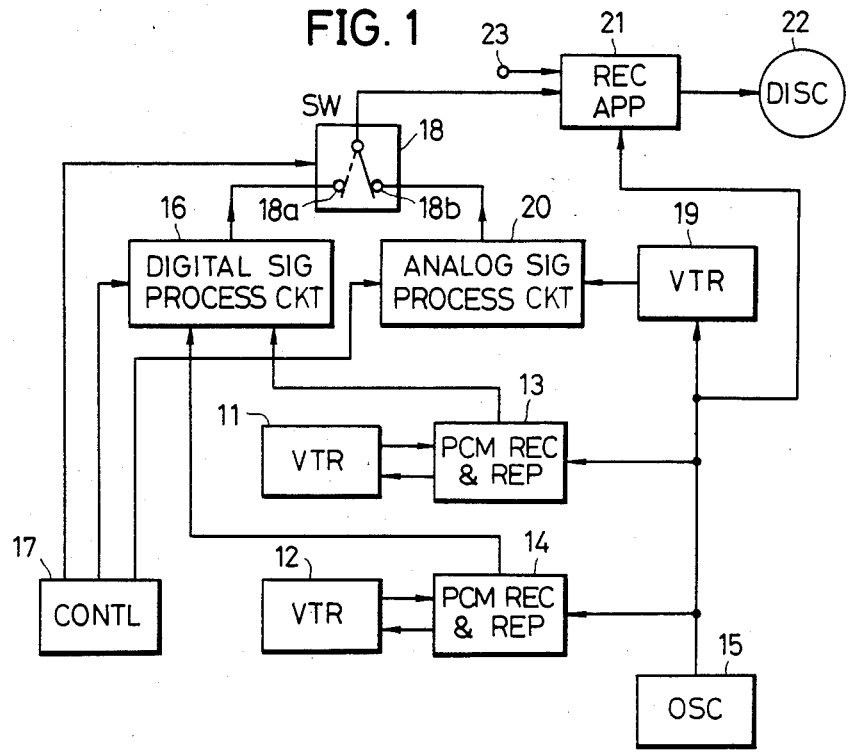
FIG. 1 is a systematic block diagram showing an example of a recording system of a disc which is to be played.

In FIG. 1, 2-channel video tape recorders (VTRs) 11 and 12 are each supplied with a synchronizing signal from respective PCM recording and reproducing apparatuses 13 and 14. On the other hand, the VTRs 11 and 12 each reproduce a 2-channel information signal which has been pre-recorded on a magnetic tape, and the reproduced information signals from the VTRs 11 and 12 are supplied to the respective PCM recording and reproducing apparatuses 13 and 14 to be recorded. The reproduced information signals from the VTRs 11 and 12, may be 2-channel audio signals, one channel of a monaural audio signal and another channel of a monaural audio signal or a still picture signal, or two channels of still picture signals. For example, the still picture signals have a signal format in which component coded data obtained by subjecting signals related to still pictures which are only in video durations of a composite color video signal employing 625 scanning lines to a digital modulation, are successively inserted into video durations of a composite synchronizing signal which is in conformance with the NTSC system.

The PCM recording and reproducing apparatuses 13 and 14 each subject an input signal to a pulse code modulation (PCM), and generate an error detecting code and error correcting codes so as to form a PCM signal including the pulse code modulated signal and these codes. The PCM recording and reproducing apparatuses 13 and 14 each add to this PCM signal horizontal and vertical synchronizing signals which are in conformance with the NTSC system, and record the signal which is obtained to a magnetic tape and reproduce the signal from the magnetic tape. For example, the PCM recording and reproducing apparatuses 13 and 14 each record 6 information words (3 words in each of the right and left channels) in one horizontal scanning period (1H). Since the data is not transmitted in a duration of 35H in one frame, a sampling frequency $f_s$ can be described by an equation $f_s = 3 \times f_H \times (525 - 35)/525$, where $f_H$ is a horizontal scanning frequency. The PCM recording and reproducing apparatuses are operated in synchronism with a signal from an oscillator 15 having a frequency of 15.734 kHz which is equal to the horizontal scanning frequency of the NTSC system. Thus, when the frequency of 15.734 kHz is substituted into the above equation, the sampling frequency $f_s$ becomes equal to 44.056 kHz.

A total of four channels of digital signals having the sampling frequency of 44.056 kHz and a quantization number of 16 bits, are respectively supplied to a digital signal processing circuit 16 from the PCM recording and reproducing apparatuses 13 and 14. The digital signal processing circuit 16 generates a signal of one block (frame) having a signal format shown in FIG. 2, under control of an output signal of a controller 17. The digital signal processing circuit 16 time-sequentially multiplexes the generated signal in terms of blocks, at a transmission frequency of 44.056 kHz. Further, the digital signal processing circuit 16 obtains a frequency modulated signal by frequency-modulating a carrier having a frequency in the range of 7 MHz, for example, by the time-sequentially multiplexed signal, and applies this frequency modulated signal to a terminal 18a of a switching circuit 18.

Figure 2:
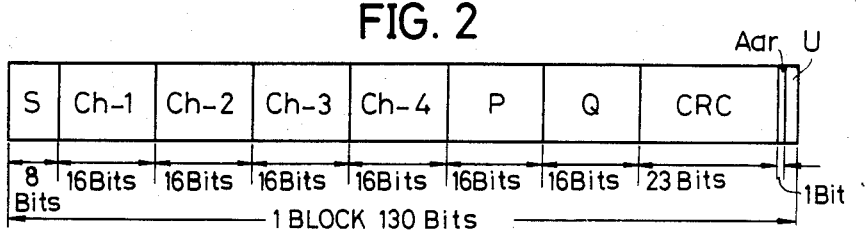
FIG. 2 shows an example of a signal format of one block of digital signal which is recorded on digital recorded tracks on the disc which is to be played.

In the signal of one block shown in FIG. 2, S indicates the position of a synchronizing signal which has an 8-bit fixed pattern and identifies the beginning of a block. Ch-1, Ch-2, Ch-3, and Ch-4 respectively indicate the position of one word of a digital signal having 16 bits. This digital signal may be a digital audio signal which is obtained by subjecting an audio signal to a pulse code modulation, or a digital video signal which is obtained by subjecting a video signal to a pulse code modulation. For example, the signals described under one of the following cases (a) through (d) may be arranged in the positions Ch-1 through Ch-4.

(a) A case where one word of each of four channels of digital audio signals, is arranged in the positions Ch-1 through Ch-4.

(b) A case where one word of each of three channels of digital audio signals is arranged in the positions Ch-1 through Ch-3, and two picture element data of a digital video signal having a quantization number of 8 bits, for example, are arranged in the position Ch-4.

(c) A case where data of each of the channels in a first 2-channel stereo digital audio signal are arranged in the positions Ch-1 and Ch-2, and data of each of the channels in a second 2-channel stereo digital audio signal are arranged in the positions Ch-3 and Ch-4.

(d) A case where data of each of the channels in a 2-channel digital audio signal are arranged in the positions Ch-1 and Ch-2, and picture element data of the same kind or different kinds of digital video signal having a quantization number of 8 bits are arranged in the positions Ch-3 and Ch-4.

In addition, P and Q in FIG. 2 indicate positions of 16-bit error correcting codes. Further, CRC indicates a position of a 23-bit error detecting code. The error detecting code is a 23-bit remainder which is obtained when each of the words arranged in the positions Ch-1 through Ch-4, P, and Q of the same block are divided by a generating polynomial of $X^{23} + X^5 + X^4 + X + 1$, for example. When the signals in the 9-th through 127-th bits of the same block are divided by the above generating polynomial during the reproduction and the remainder is zero, it is detected that there is no error in that block. Moreover, in FIG. 2, Adr indicates a multiplexing position of 1 bit of one of various kinds of address signals which are used during a random access and the like. The bits of the address signal are distributed, and 1 bit of the address signal is transmitted in one block. For example, all of the bits of the address signal are transmitted in 196 blocks (in this case, the address signal has 196 bits).

In FIG. 2, U indicates a position of a 2-bit signal which is often called user's bits. One block of the digital signal is therefore made up of 130 bits from the position S to the position U. The digital signal is time-sequentially multiplexed and transmitted in terms of blocks, at a frequency of 44.056 kHz which is equal to the sampling frequency of the digital audio signal.

Figure 3:
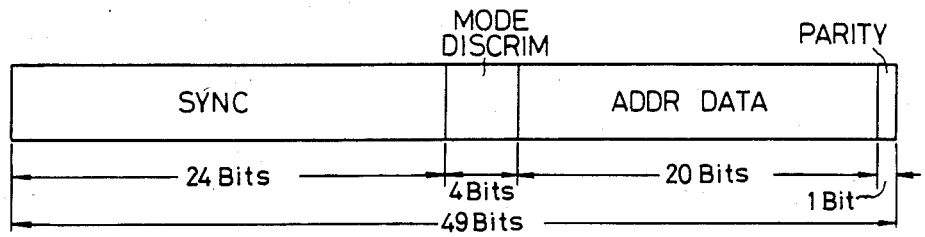
FIG. 3 shows an example of a signal format of each of address codes which are recorded on the digital recorded tracks on the disc which is to be played.

For example, the 196-bit address signal is time-sequentially made up from four kinds of address codes each having 49 bits. The four kinds of address codes comprise a time address code and first through third chapter address codes, for example, and the constitution of each address code is the same. The address codes each have a signal format shown in FIG. 3. In FIG. 3, a 24-bit synchronizing signal is arranged in the first 24 bits of the address code as indicated by SYNC. The value of the 24-bit synchronizing signal differs depending on the four kinds of address codes. 4 bits which are subsequent to the 24-bit synchronizing signal, includes a source mode signal, a normal/stop mode discriminating signal, and the like. The source mode signal indicates the source mode, that is, the combination of the recorded signals from among the cases (a) through (d) described before. The normal/stop mode discriminating signal indicates whether the video disc player should assume a stop reproduction mode in which the same track turn is repeatedly reproduced. The address data is located in the 20 bits which are subsequent to these 4 bits, and the last 1 bit of the address code is a parity bit.

In the case of the time address code, the address data is a time data which indicates the reproducing time which would take in the normal reproduction mode to reach the track position where that time address code is recorded, from the starting position where the recording of the programs was started at the time of the recording. On the other hand, in the case of the chapter address code, the address data indicates the location of the music program which is recorded at the position where that chapter address code is recorded, with respect to the starting position where the recording of the programs was started at the time of the recording. Thus, the chapter address code indicates that the music program is the third program from the starting position on a disc, for example.

As will be described later on in the specification, an NTSC system color video signal is recorded on a disc 22 at a rate of four fields in one revolution of the disc 22. This means that the recorded signals are reproduced in a state where the disc 22 is rotated at a rotational speed of 889.1 $(=(59.94/4)\times 60)$ revolutions per minute. Hence, 2940 $(\approx 44.056 \times 10^3 \times (4/59.94))$ blocks (frames) are recorded on and reproduced from the disc 22 in one revolution of the disc 22. Accordingly, the 196-bit address signal is recorded on and reproduced from the disc 22, 15 times in one revolution of the disc 22.

When transmitting the digital video signal related to the still picture by arranging the digital video signal in the position Ch-3 and/or the position Ch-4 shown in FIG. 2, the picture element data of the luminance signal, having a sampling frequency of 9 MHz and a quantization number of 8 bits, are converted into luminance picture element data having a sampling frequency of 88.112 kHz. Moreover, the picture element data of the two kinds of color difference signals (R-Y) and (B-Y), having a sampling frequency of 2.25 MHz and a quantization number of 8 bits, are converted into color difference picture element data having a sampling frequency of 88.112 kHz. These luminance picture element data and color difference picture element data corresponding to one frame, are transmitted with a signal format shown in FIG. 4.

Figure 4:
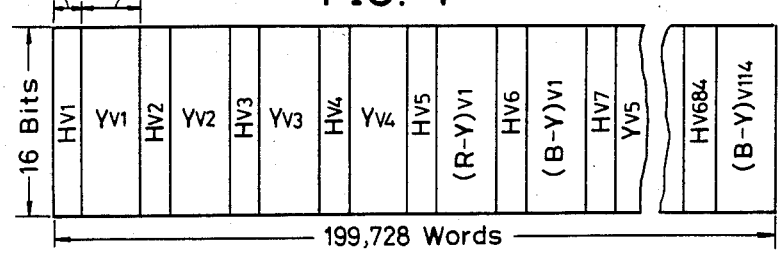
FIG. 4 shows an example of a signal format of a digital video signal which is recorded on the digital recorded tracks on the disc which is to be played.

In FIG. 4, one word is made up of 16 bits, and each of the picture element data having the quantization number of 8 bits are arranged in the upper 8 bits and the lower 8 bits of one word. Hence, two picture element data can be transmitted in one word. The digital video signal corresponding to one frame comprises a total of 199,728 words as shown in FIG. 4. Picture element data groups $Y_{V1}$ through $YV_{456}$ of the digital luminance signal each made up of 286 words, picture element data groups $(R-Y)_{V1}$ through $(R-Y)_{V114}$ and $(B-Y)_{V1}$ through $(B-Y)_{V114}$ of the digital color difference signals each made up of 286 words, and a total of 684 header signals $H_{V1}$ through $H_{V684}$ each made up of 6 words and multiplexed to the beginning of each of the picture element data groups, are time-sequentially multiplexed in this digital video signal corresponding to one frame.

Figure 5:
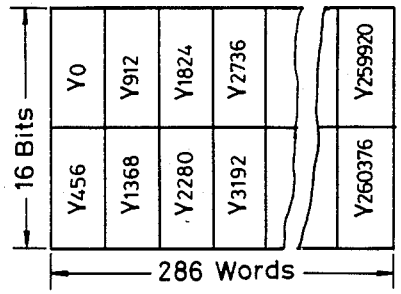
FIG. 5 shows a part of the signal format shown in FIG. 4 in more detail.

A total of 572 luminance picture element data groups in the first vertical column at the leftmost part of the screen are indicated by $Y_{V1}$, and each of the picture element data are arranged in sequence from the top of the screen to the bottom of the screen. As shown in FIG. 5, a picture element data $Y_0$ at the uppermost part of the screen is arranged in the upper 8 bits of the first word, and a picture element data $Y_{456}$ at the second uppermost part of the screen is arranged in the lower 8 bits of the first word. Similarly, a picture element data $Y_{912}$ is arranged in the upper 8 bits of the second word, a picture element data $Y_{1368}$ is arranged in the lower 8 bits of the second word, a picture element data $Y_{1824}$ is arranged in the upper 8 bits of the third word, . . . , and a picture element data $Y_{260376}$ at the lowermost part of the screen is arranged in the lower 8 bits of the 286-th word. A total of 572 luminance picture element data groups in the second column from the left end of the screen are indicated by $Y_{V2}$ in FIG. 4, and a total of 572 luminance picture element data groups in the third column from the left end of the screen are indicated by $Y_{V3}$. Similarly, a total of 572 luminance picture element data groups in the i-th (i is an integer from 1 to 456) column from the left end of the screen are indicated by $Y_{Vi}$. Each of the picture element data are arranged similarly as the above picture element data group $Y_{V1}$, and the picture element data corresponding to one vertical column are transmitted by 286 words.

In addition, a total of 572 picture element data groups of the first digital color difference signal arranged in the j-th (j is an integer from 1 to 114) column from the left end of the screen are indicated by $(R-Y)_{Vj}$, and a total of 572 picture element data groups of the second digital color difference signal arranged in the j-th column from the left end of the screen are indicated by $(B-Y)_{Vj}$. Each of the 572 picture element data groups corresponding to one column are arranged in a sequence starting from the top to the bottom of the screen in the upper 8 bits of the first word, lower 8 bits of the first word, upper 8 bits of the second word, lower 8 bits of the second word, upper 8 bits of the third word, . . . , and lower 8 bits of the 286-th word, and the picture element data corresponding to one column are transmitted by 286 words. A header signal having 6 bits, for example, is added to the beginning of each of the above divided picture element data groups.

Further, as shown in FIG. 4, the above component coded signal has a signal format in which the signal is time-sequentially transmitted in terms of units, where one unit comprises a total of six picture element data groups, that is, four picture element data groups $Y_{V(4j-3)}$, $Y_{V(4j-2)}$, $Y_{V(4j-1)}$, and $Y_{V(4j)}$ and the two kinds of digital color difference signals $(R-Y)_{Vj}$ and $(B-Y)_{Vj}$.

As shown in FIG. 4, the header signals $H_1$ through $H_{684}$ are respectively arranged at the beginnings fo each of the 684 picture element data groups $Y_i$, $(R-Y)_j$, and $(B-Y)_j$. The header signals are transmitted as discriminating signals, so that the reproducing apparatus can discriminate each of the various kinds of information contained in the picture element data group which follows immediately after the header signal. The header signals $H_1$ through $H_{684}$ each comprise 6 words and have a common signal format.

Figure 6:
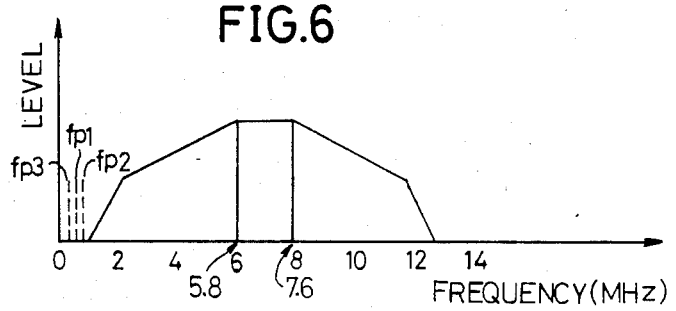
FIG. 6 shows an example of frequency spectrums of frequency modulated signals and reference signals which are recorded on the digital recorded tracks on the disc which is to be played.

Returning now to the description of FIG. 1, the digital signal processing circuit 16 applies the frequency modulated signal (first FM signal) to the terminal 18a of the switching circuit 18. A frequency spectrum of this first FM signal is indicated by a solid line in FIG. 6. The carrier frequency is equal to 7.6 MHz when the data is "1", and the carrier frequency is equal to 5.8 MHz when the data is "0". In FIG. 6, frequency spectrums represented by phantom lines fp1, fp2, and fp3, indicate the frequency spectrums of reference signals fp1, fp2, and fp3 which are recorded together with the first FM signal.

On the other hand, a VTR 19 plays a magnetic tape which has been pre-recorded with an NTSC system color video signal related to a moving picture and an audio signal, and supplies to an analog signal processing circuit 20 the signals which are reproduced from the magnetic tape. The analog signal processing circuit 20 generates a frequency modulated signal having the same signal format as the frequency modulated signal which is recorded on the video disc described before, and multiplexes each of the various kinds of address signals within the vertical blanking period. The concrete construction of the analog signal processing circuit 20 is disclosed in the U.S. Pat. No. 4,208,671 in which the assignee is the same as the assignee of the present application, for example, and is known. Thus, detailed description will not be given with respect to the concrete construction of the analog signal processing circuit 20.

The analog signal processing circuit 20 produces a band-share-multiplexed signal in which a band limited luminance signal and a low-band-converted carrier chrominance signal which has been frequency-converted into a low frequency range are band-share-multiplexed. The analog signal processing circuit 20 also independently produces a chapter address signal $A_C$, a time address signal $A_T$, and a track number address signal $A_N$. These address signals are multiplexed into specific durations of 1H within the vertical blanking period of the band-share-multiplexed signal, so as to obtain a predetermined multiplexed signal. A predetermined carrier is then frequency-modulated by a signal which is obtained by subjecting the predetermined multiplexed signal to a frequency-division-multiplexing with a frequency modulated audio signal. The address signal $A_C$ indicates the recorded position on the disc in terms of the order of the recorded programs, and the time address signal $A_T$ indicates the total reproducing time. In addition, the track number address signal $A_N$ indicates the number of tracks when it is assumed that one track is formed from the recorded position of the reference signal fp3 as the disc undergoes one revolution. The address signals $A_C$, $A_T$, and $A_N$ each comprise 29 bits.

Figure 7:
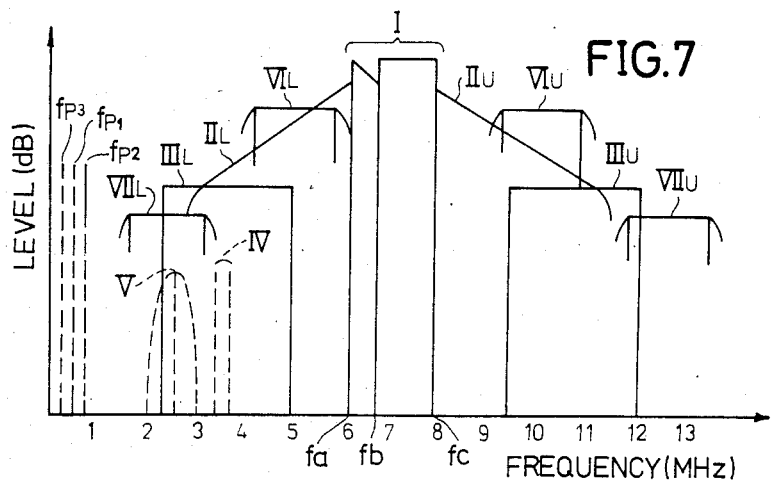
FIG. 7 shows an example of frequency spectrums of frequency modulated signals and reference signals which are recorded on analog recorded tracks on the disc which is to be played.

FIG. 7 shows a frequency spectrum of the output signal of the analog signal processing circuit 20. In FIG. 7, I represents a carrier deviation band of 2.3 MHz of the frequency modulated luminance signal, $f_a$ represents a frequency of 6.1 MHz corresponding to the tip end of the synchronizing signal (sync tip), $f_b$ represents a frequency of 6.6 MHz corresponding to the pedestal level, and $f_c$ represents a frequency of 7.9 MHz corresponding to the white peak. Further, $II_U$ and $II_L$ respectively represent upper and lower sidebands of the frequency modulated luminance signal, and $III_U$ and $III_L$ respectively represent upper and lower sidebands of the signal which is obtained by further frequency-modulating frequency modulated audio signals $f_{A1}$ and $f_{A2}$. Moreover, IV represents carriers of 3.43 MHz and 3.73 MHz of the 2-channel frequency modulated audio signals $f_{A1}$ and $f_{A2}$.

In addition, V represents a frequency band of the low-band-converted carrier chrominance signal which is obtained by frequency-converting the carrier chrominance signal within the reproduced signal from the VTR 19. First sidebands which are obtained when the low-band-converted carrier chrominance signal is frequency-modulated, are represented by $VI_U$ and $VI_L$, and second sidebands which are obtained when the low-band-converted carrier chrominance signal is frequency-modulated, are represented by $VII_U$ and $VII_L$. In FIG. 7, the frequency spectrums of the signals which are obtained from the analog signal processing circuit 20, are indicated by solid lines.

The reference signals fp1, fp2, and fp3 described later on in the specification, are located in the unoccupied frequency band below the band $VII_L$ shown in FIG. 7. The occupying frequency bands of the reference signals fp1 through fp3 and the information signals are separated, because the reference signals fp1 through fp3 and the information signals need to be picked up from the disc by the same reproducing stylus.

The first FM signal having the frequency spectrum indicated by the solid line in FIG. 6 is applied to the terminal 18a of the switching circuit 18, and a second FM signal having the frequency spectrum indicated by the solid line in FIG. 7 is applied to a terminal 18b of the switching circuit 18. The switching circuit 18 selectively produces and supplies only one of the first and second FM signals to a recording apparatus 21 under control of an output signal of the controller 17. The recording apparatus 21 is a known cutting apparatus which employs a laser beam. The recording apparatus 21 is supplied with the output signal of the switching circuit 18 as a first input signal, and a signal from an input terminal 23 as a second input signal. This second input signal from the input terminal 23 comprises a reference signal in which the first and second reference signals fp1 and fp2 are alternately switched and arranged in a burst manner for every duration of four fields which is equal to a duration of one revolution of the disc, and the third reference signal fp3 which is generated in relation to the position where the first and second reference signals fp1 and fp2 switch. The recording apparatus 21 converts the first and second input signals to first and second modulated laser beams, and simultaneously impinges the first and second modulated laser beams on a photosensitive agent which covers the surface of an original recording disc, with the first and second modulated laser beams mutually separated by approximately ½ track pitch. Then, the original recording disc is subjected to a known developing process, and to a known disc manufacturing process. As a result, the disc 22 which is produced, has an electrode function, does not have guide grooves for guiding the reproducing stylus, and has a track pattern shown in FIG. 8.

Figure 8:
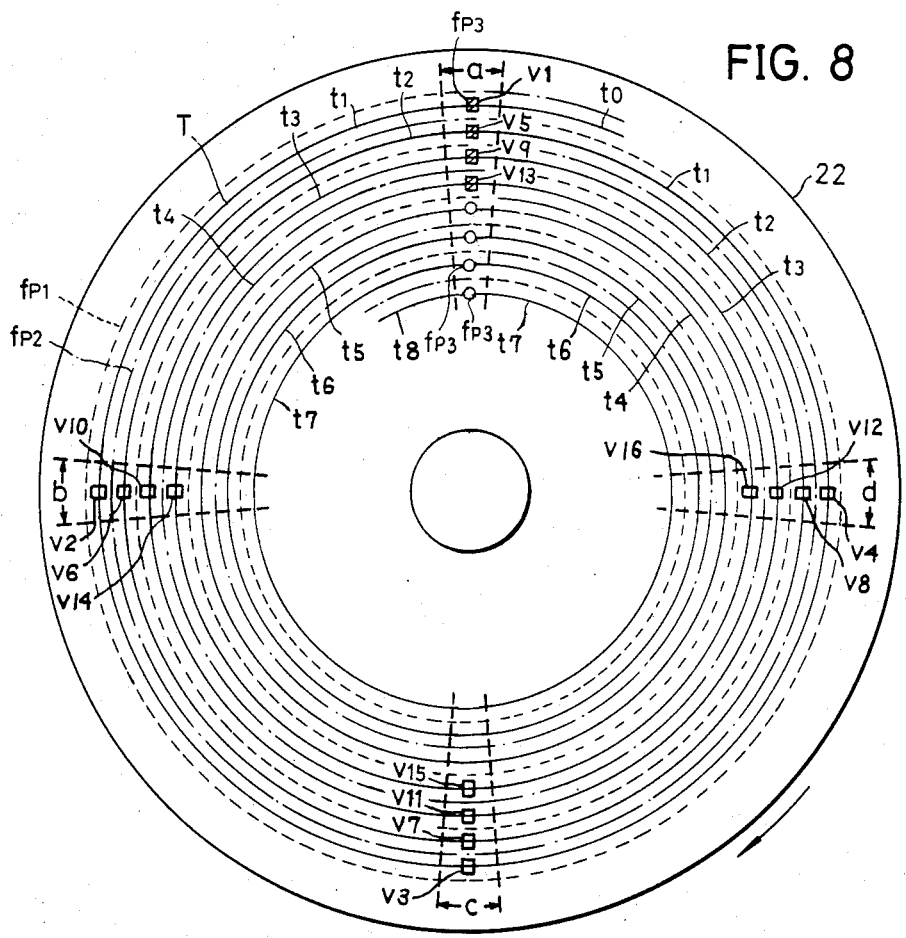
FIG. 8 shows an example of a track pattern on the disc which is to be played.

The first FM signal or the second FM signal from switching circuit 18, is recorded on a spiral track T on the disc 22 shown in FIG. 8, as rows of intermittent pits. In the single and continuous spiral track T which is indicated by a solid line in FIG. 8, each track turn of the disc 22 is represented by t1, t2, t3, . . . . Each track is formed with pits of the information signal on a flat surface thereof, and no guide groove is formed for guiding the reproducing stylus. With respect to one track turn, pits of the first reference signal fp1 and pits of the second reference signal fp2 are respectively formed on both sides thereof along the longitudinal direction of the track for every horizontal scanning period (1H), at positions corresponding to the horizontal blanking period.

Pits of only one of the reference signals fp1 and fp2 are formed at an intermediate position between center lines of adjacent track turns. Moreover, with respect to one track turn, the sides on which the reference signals fp1 and fp2 are recorded, are alternated for each track turn. In other words, the tracks of the first reference signal fp1 are represented by broken lines, and the tracks of the second reference signal fp2 are represented by one-dot chain lines in FIG. 8. Positions where the vertical synchronizing signal is recorded in each field, are represented by $V_1$, $V_2$, $V_3$, . . . . Furthermore, the third reference signal fp3 is recorded for a duration of approximately 3H, for example, at the starting positions of the tracks t1, t2, t3, . . . , that is, the positions $V_1$, $V_5$, $V_9$, . . . where the sides on which the reference signals fp1 and fp2 are recorded are interchanged.

The address signals $A_C$, $A_T$, and $A_N$ are time-sequentially recorded in recording parts a through d which correspond to the four vertical blanking periods in each of the analog recorded tracks t1 through t4 on the disc 22.

The digital recorded tracks t5, t6, t7, . . . are also formed on the spiral track T. However, the signal of one block having the signal format shown in FIG. 2, is time-sequentially multiplexed at the transmission frequency of 44.056 kHz and is recorded on the digital recorded tracks t5 through t7 as the first FM signal. Thus, the recording parts a through d which correspond to the vertical blanking periods, do not exist in the digital recorded tracks t5 through t7. On the other hand, the reference signal fp3 is recorded on the digital recorded tracks t5 through t7, radially aligned with the reference signal fp3 which is recorded on the analog recorded tracks t1 through t4. Moreover, the reference signals fp1 and fp2 are recorded on both sides of the digital recorded tracks t5 through t7 with a period of 1H. In other words, the reference signals fp1 through fp3 are constantly recorded on the disc with constant periods, regardless of whether the recorded track is an analog recorded track or a digital recorded track.

The track pattern itself is the same as the track pattern on the video disc and the digital audio disc which have been previously proposed under the same assignee. In addition, the signal format (FIGS. 2 and 3) of the digital signal recorded on the digital recorded tracks, the signal format of the digital video signal (especially related to the still picture, but may be related to a partially moving picture) shown in FIGS. 4 and 5, and the frequency spectrum of the FM signal shown in FIG. 6 which is to be recorded on the digital recorded tracks, are the same as those of the above digital audio disc. Furthermore, the frequency spectrum of the FM signal shown in FIG. 7 which is recorded on the analog recorded tracks, are also the same as that of the above video disc.

The disc which is recorded by the recording system shown in FIG. 1, is characterized in that the digital recorded tracks which are recorded with the first FM signal from the digital signal processing circuit 16, and the analog recorded tracks which are recorded with the second FM signal from the analog signal processing circuit 20, coexist on the same side of the disc depending on the recording information contents. In other words, audio information such as an audio signal related to a music which needs to be reproduced with a high fidelity, and video information such as a video signal related to a still picture such as a page of encyclopedia or the like, are recorded on the digital recorded tracks. On the other hand, video information such as a video signal related to a moving picture, is recorded on the analog recorded tracks.

The rotational speed of the digital audio disc previously proposed under the same assignee, is 900 rpm. In addition, the number of blocks in one revolution of this digital audio disc is 2940, and the transmission frequency of one block is 44.1 kHz. On the other hand, in the disc 22, the number of blocks in the digital recorded track in one revolution of the disc 22 is also 2940 and is the same as the number of blocks in the digital audio disc, however, the rotational speed of the disc 22 is 899.1 rpm which is the same as the rotational speed of the video disc. Further, in the disc 22, the transmission frequency of one block is selected to 44.056 kHz which is extremely close to 44.1 kHz. That is, the rotational speed of the disc 22 for reproducing the composite video signal which has 525 scanning lines, a field frequency of 59.94 Hz, and is recorded on the analog recorded tracks, is 899.1 rpm. In order to reproduce the digital signal from the digital recorded tracks on the disc 22 at the same rotational speed of 899.1 rpm, the transmission frequency of the digital signal recorded on the digital recorded tracks is selected at $44.1 \times 10^3 \times 899.1/900 = 44.056 \times 10^3$ Hz.

Accordingly, it is possible to play the disc 22 on the existing disc reproducing apparatus, compatibly with the existing digital audio disc and the existing video disc which were previously proposed under the same assignee, by only making a simple modification of the existing disc reproducing apparatus.

In the disc 22, four first tracks and four second tracks, that is, a total of eight tracks, are formed between the digital recorded track and the analog recorded track. The first track is recorded with the first FM signal having a signal which is silent and contains no data as the modulating signal. The second track is recorded with the second FM signal having a composite video signal (so-called black burst signal) which contains all black picture information in the video durations of the composite video signal as the modulating signal. In this case, the first tracks are formed adjacent to the digital recorded tracks, and the second tracks are formed adjacent to the analog recorded tracks. As a result, when the reproducing stylus moves from the first track to the second track, it can be detected from the second FM signal which is reproduced from the second track that the analog recorded tracks will be reproduced subsequently. On the other hand, when the reproducing stylus moves from the second track to the first track, it can be detected from the first FM signal which is reproduced from the first track that the digital recorded track will be reproduced subsequently.

Four first tracks and four second tracks exist between the digital recorded track and the analog recorded track. Thus, even when a dropout occurs in the reproduced signal, it is possible to positively detect the position where the recorded track changes between the digital recorded track and the analog recorded track. In addition, even when there is a time delay in a circuit which carries out a switching and operates one of a digital signal demodulating circuit and an analog signal demodulating circuit so as to demodulate the signals which are reproduced from the disc, it is possible to demodulate the signals reproduced from the analog recorded tracks or the digital recorded tracks only after one of the demodulating circuits has been operated, since the switching can be completed while the reproducing stylus reproduces the first and second tracks.

Next, description will be given with respect to another example of a recording system for recording the disc which is to be played, by referring to FIG. 9. In FIG. 9, those parts which are the same as those corresponding parts in FIG. 1 are designated by the same reference numerals. PCM recording and reproducing apparatuses 25 and 26 each obtain data, by subjecting an analog audio signal or still picture signal which is reproduced from a magnetic tape by the respective VTRs 11 and 12, to a pulse code modulation. Then, the PCM recording and reproducing apparatuses 25 and 26 each obtain a PCM signal by adding the error detecting code and the error correcting codes to the pulse code modulated signal. Further, the PCM recording and reproducing apparatuses 25 and 26 each add to the PCM signal the horizontal and vertical synchronizing signals which are in conformance with the SECAM system. For example, the PCM recording and reproducing apparatuses 25 and 26 respectively have the same construction as the PCM recording and reproducing apparatuses 13 and 14 shown in FIG. 1. An oscillator 27 produces a signal having a frequency of 15.625 kHz which is equal to the horizontal scanning frequency of the PAL system or the SECAM system. The PCM recording and reproducing apparatuses 25 and 26 each operate in synchronism with a signal from a frequency divider 28. This signal from the frequency divider 28 has a frequency of 15.75 kHz, because the frequency divider 28 frequency-divides the signal from the oscillator 27 by 126/125. Therefore, the sampling frequency $f_s$ in this case is equal to 44.100 kHz.

A total of four channels of digital signals having the sampling frequency of 44.100 kHz and a quantization number of 16 bits, are respectively supplied to a digital signal processing circuit 29 from the PCM recording and reproducing apparatuses 25 and 26. The digital signal processing circuit 29 generates a signal of one block (frame) having a signal format shown in FIG. 2, under control of the output signal of the controller 17. The digital signal processing circuit 29 time-sequentially multiplexes the generated signal in terms of blocks, at a transmission frequency of 44.100 kHz. Further, the digital signal processing circuit 29 obtains a frequency modulated signal by frequency-modulating a carrier having a frequency in the range of 7 MHz, for example, by the time-sequentially multiplexed signal, and applies this frequency modulated signal having the frequency spectrum shown in FIG. 6 to the terminal 18a of the switching circuit 18.

In other words, digital signals having the same signal format as the digital signals recorded in the example of the recording system described previously, are recorded on the digital recorded tracks on a disc 31 according to this second example of the recording system. The difference between the first and second examples, is that the transmission frequency of the blocks is equal to 44.100 kHz in this second example. Further, as will be described later on in the specification, a composite color video signal which is to be reproduced as a PAL or SECAM system color video signal having 625 scanning lines and a field frequency of 50 Hz, is recorded on the analog recorded tracks at a rate of four fields in one revolution of the disc 31, unlike in the first example. Accordingly, the disc 31 on which the analog recorded tracks and the digital recorded tracks coexist, is rotated at a rotational speed of $750(=(50/4)\times 60)$ rpm when reproducing the recorded signals from the disc 31. This means that 3528 $(=44.100\times 10^3\times(4/50))$ blocks are recorded on and reproduced from the disc 31 in one revolution of the disc 31. Therefore, the 196-bit address signal having the signal format shown in FIG. 3, is recorded on and reproduced from the disc 31, 18 times in one revolution of the disc 31.

On the other hand, a VTR 30 plays a magnetic tape (not shown) which has been pre-recorded with a PAL or SECAM system color video signal related to a moving picture and an audio signal, in synchronism with the signal from the oscillator 27 having the frequency of 15.625 kHz which is equal to the horizontal scanning frequency. The VTR 30 supplies to the analog signal processing circuit 20 the signals which are reproduced from the magnetic tape. The analog signal processing circuit 20 generates the second FM signal which has the frequency spectrum indicated by the solid line in FIG. 7 as the second FM signal, as described previously.

The track pattern itself on the disc 31, is the same as the track pattern shown in FIG. 8, and is therefore the same as the track pattern on the disc 22. However, the transmission frequency of the blocks of the digital signals recorded on the digital recorded tracks on the disc 31 and the number of blocks in one revolution of the disc 31, the number of scanning lines and the horizontal scanning frequency of the composite video signal recorded on the analog recorded tracks on the disc 31, and the rotational speed of the disc 31, are respectively different from those of the disc 22.

Next, description will be given with respect to a disc reproducing apparatus of the present invention. FIG. 10 is a systematic block diagram showing an embodiment of a disc reproducing apparatus according to the present invention. As described before, the disc reproducing apparatus according to the present invention is designed to compatibly play first through fifth discs, where the analog recorded tracks and the digital recorded tracks coexist on the first and second discs. The composite video signal of the NTSC system, for example, having 525 scanning lines is pre-recorded on the analog recorded tracks on the first disc, and the composite video signal of the PAL or SECAM system, for example, having 625 scanning lines is pre-recorded on the analog recorded tracks on the second disc. The third and fourth discs are the existing video discs which only comprise the analog recorded tracks. The composite video signal having 525 scanning lines is pre-recorded on the third disc, and the composite video signal having 625 scanning lines is pre-recorded on the fourth disc. The fifth disc is the digital audio disc described before which has been previously proposed. The disc reproducing apparatus according to the present invention supplies the reproduced composite video signal to either one of a monitoring reproducing apparatus of the system employing 525 scanning lines or a monitoring reproducing apparatus of the system employing 625 scanning lines. For convenience' sake, it will be assumed that the monitoring reproducing apparatus is originally designed to display the NTSC system color video signal having 525 scanning lines, and description will hereinafter be given with respect to a disc reproducing apparatus which supplies the reproduced composite video signal to such a monitoring reproducing apparatus. A recording and reproducing system which enables a monitoring reproducing apparatus to satisfactorily reproduce and display signals from a video disc which has been pre-recorded with a video signal having a number of scanning lines different from that of a television signal that the monitoring reproducing apparatus is originally designed to reproduce and display, has already been disclosed in a U.S. Pat. No. 4,445,143 in which the assignee is the same as the assignee of the present application.

The rotation control based on the above recording and reproducing system, is carried out as will be described hereinafter by a servo circuit for a motor 38 which rotates a turntable 37 within a player part 35 in FIG. 10. In FIG. 10, a disc reproducing apparatus comprises the player part 35 and an adapter part 36. When a load switch of an input device 39 is manipulated, an output signal of this load switch is supplied to a command processor 40, and is then supplied to a microprocessor 41. Signals from the input device 39, command signals from an external device such as a personal microcomputer having a discriminating function, and the like, are supplied to the command processor 40. The command processor 40 carries out operations such as driving a display device (not shown) according to a display mode, and transferring the signals from the input device 39 to the microprocessor 41.

As will be described later on in the specification, the microprocessor 41 generates and supplies signals such as a clock signal and a status signal to the command processor 40. On the other hand, the microprocessor 41 controls the operations of various mechanisms and circuits within the player part 35, and puts the player part 35 in a state where a disc 34 can be inserted into the player part 35 from the outside in response to the output signal of the load switch. As described in the U.S. Pat. No. 4,352,174 in which the assignee is the same as the assignee of the present application, the disc 34 is accommodated within a disc accommodating case (not shown) when the disc 34 is outside the player part 35. When the disc accommodating case accommodating therein the disc 34 is inserted into the player part 35 in the above state and is then extracted from the player part 35, predetermined mechanisms operate to keep the disc 34 and a lid plate of the disc accommodating case inside the player part 35. Description of the predetermined mechanisms will be omitted in the present specification. As a result, only an empty jacket of the disc accommodating case is extracted from the player part 35. The disc 34 is placed onto the turntable 37 inside the player part 35.

On the other hand, at the same time, a plurality of microswitches (not shown) located at the innermost part of the player part 35 are turned ON and OFF depending on the combination of the existence and non-existence of cutouts located on the front end of the lid plate. As disclosed in a U.S. Pat. No. 4,419,710 in which the assignee is the same as the assignee of the present application, it is possible to detect various recorded contents on the disc, the side of the disc to be reproduced, and the like, from the ON and OFF states of the microswitches. The output signals of the microswitches, such as a disc discriminating signal which indicates whether the disc 34 is a digital audio disc or a video disc (it will be assumed that the disc according to the present invention is discriminated as being a video disc), are supplied to the microprocessor 41 through an input terminal 42. Hence, the microprocessor 41 serially supplies a 25-bit status signal, for example, to a pin terminal $43_3$ of a DIN-type 8-pin connector.

Figure 11:
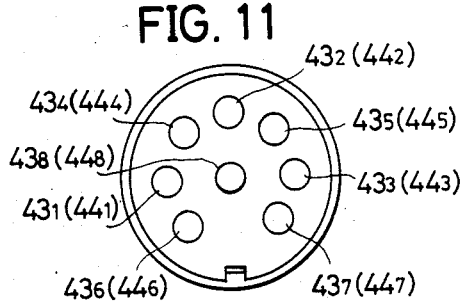
FIG. 11 shows an example of an 8-pin connector used in the reproducing apparatus.

As shown in FIG. 11, the 8-pin connector comprises pin terminals $43_1$ through $43_8$. The address data from the adapter part 36 is applied to the pin terminal $43_1$, and a reproduced signal (RF signal) is produced through the pin terminal $43_2$ as will be described hereinafter. A command signal of an external device such as a personal microcomputer having a discriminating function, is applied to the pin terminal $43_4$ according to the needs. The clock signal from the microprocessor 41 is produced through the pin terminal $43_5$. An external synchronizing signal from the adapter part 36, is applied to the pin terminal $43_7$. Further, the pin terminal $43_8$ is grounded, and the pin terminal $43_6$ is not used. When coupling the player part 35 to a personal microcomputer or the like, unlike in the case where the player part 35 is coupled to the adapter part 36, the address data is produced from the pin terminal $43_1$, the reproduced audio signal is produced through the pin terminal $43_6$, and the pin terminal $43_7$ is not used.

FIG. 12 shows the upper 16 bits (2 bytes) of the 25-bit status signal which is produced through the pin terminal $43_3$. The status signal is transmitted serially from the leftmost bit (most significant bit or MSB) in FIG. 12. The upper 4 bits including the MSB indicates the reproducing side of the disc 34 and the contents of the recorded signal according to the input signal from the input terminal 42. Among the upper 4 bits, the first bit indicates the reproducing side of the disc 34, and indicates that a first side is being reproduced when this first bit is "0" and indicates that a second side is being reproduced when this first bit is "1". The second bit indicates whether the disc 34 is a digital audio disc or a video disc (as described before, the disc 22 will be detected as being a video disc). The third bit indicates whether the disc 34 is a type of a disc which should be reproduced in a state (in a normal reproduction mode) where the player part 35 and the adapter part 36 cooperate, or is a type of a disc which should be reproduced in a state (in an interactive reproduction mode) where an external device such as a personal microcomputer having a discriminating function and the player part 35 cooperate. The disc which should be played in the normal reproduction mode, is the existing digital audio disc which is recorded with the signals (the 4-channel audio signal, two kinds of 2-channel audio signals, and the like) under one of the four cases (a) through (d) described before, or the existing video disc (or the disc 22) which is recorded with two channels of audio signals. On the other hand, the disc which should be played in the interactive reproduction mode, is a disc which is recorded with signals (for example, four channels of monaural audio signals and time base compressed audio signals) of formats other than the formats of the signals recorded on the disc which should be played in the normal reproduction mode. The fourth bit of the status signal indicates whether the recorded video signal is of the PAL (or SECAM) system employing 625 scanning lines or is of the NTSC system employing 525 scanning lines.

Fifth and sixth bits of the status signal indicate the address data which is to be displayed. When the fifth and sixth bits are "00", the chapter address data is discriminated and reproduced from the reproduced signal so as to write-in mainly the chapter address data which indicates the sequence of the recorded programs. On the other hand, when the fifth and sixth bits are "01", the time address data which indicates the total reproducing time of the recorded program from the first track position, is discriminated and reproduced from the reproduced signal. When the fifth and sixth bits are "10", the track address data which indicates the sequence of the tracks, is discriminated and reproduced from the reproduced signal. Further, in a case where two kinds of 2-channel stereo signals are recorded on the digital audio disc, the fifth and sixth bits are "10" when one of the 2-channel stereo audio signals is to be selectively reproduced, and the fifth and sixth bits are "11" when the other of the 2-channel stereo audio signals is to be selectively reproduced.

The seventh and eighth bits of the status signal contain information on whether a normal reproduction is to be carried out with respect to a disc of the type which was previously proposed in a U.S. patent application Ser. No. 433,872 in which the assignee is the same as the assignee of the present application, or whether the reproduction is to be carried out with respect to a disc of the type which was previously proposed in a U.S. patent application Ser. No. 394,317 in which the assignee is the same as the assignee of the present application, for example. A video signal of the same unit (the same picture of a movie film, the same field of a video signal, or the like) is recorded on the same track on the former disc, and a stop code indicating repeated reproduction of the same track is recorded on the latter disc.

Among the second byte of the status signal, from the ninth through sixteenth bits, the information indicating the reproduction mode is arranged in the upper 4 bits thereof. The information indicating the position of a carriage (comprising a reproducing stylus 68 or the like and is fed by a feed mechanism 67 which will be described later on in the specification) is arranged in the lower 4 bits of the second byte. In FIG. 12, the designations "0" through "F" illustrated on the left of the second byte, indicate the value of the upper or lower 4 bits in the second byte in hexadecimal. Accordingly, when the second byte of the status signal is "03" in hexadecimal, it is indicated that the carriage is moving at a normal speed to carry out a normal reproduction.

The illustration of the remaining 9 bits of the 25-bit status signal is omitted in FIG. 12. However, a 4-bit muting status signal and a 2-bit display mode signal are arranged in 6 bits among the remaining 9 bits of the status signal, and the remaining 3 bits are reserved for other purposes.

The status signal from the microprocessor 41 shown in FIG. 10, is produced in synchronism with the clock signal. This status signal is supplied to a status decoding circuit 45 wherein the value of the second bit of the status signal is detected, through a pin terminal $44_3$ of a DIN-type 8-pin connector comprising pin terminals $44_1$ through $44_8$ as shown in FIG. 11. The second bit of the status signal indicates whether the disc 34 is a digital audio disc or a video disc (the disc 22 will be detected as a video disc). The clock signal is supplied to the status decoding circuit 45 and the like, through the pin terminals $43_5$ and $44_5$. An output signal of the status decoding circuit 45 is applied to switching circuits 46 and 47 as a switching signal. When the digital audio disc is being played, the switching circuits 46 and 47 are connected to respective terminals A in response to this switching signal. On the other hand, when the video disc or the disc 22 on which the analog recorded tracks and the digital recorded tracks coexist is being played, the switching circuits 46 and 47 are connected to respective terminals V in response to the switching signal from the status decoding circuit 45. Accordingly, in a case where the disc 34 being played is the disc 22, the switching circuits 46 and 47 are connected to the respective terminals V.

Oscillators 48 and 49 are provided within the adapter part 36. The oscillator 48 produces a signal having a frequency which is four times the chrominance subcarrier frequency (3.579545 MHz in this case) of the color video signal which is to be originally reproduced in a monitoring reproducing apparatus (not shown) which is supplied with the reproduced composite video signal from the disc reproducing apparatus. The oscillator 49 produces a signal having a frequency of 6.174 MHz which is 140 times the transmission frequency of the digital signals (blocks) in the digital audio disc. The output signal of the oscillator 49 having the frequency of 6.174 MHz is supplied to the terminal A of the switching circuit 46. Further, the output signal of the oscillator 49 is frequency-divided by 1/392 into a signal having a frequency of 15.75 kHz in a frequency divider 50. On the other hand, the output signal of the oscillator 48 is frequency-divided by 1/910 into a signal having the horizontal scanning frequency of 15.734 kHz in a frequency divider 51. The output signal of the frequency divider 51 is supplied to the terminal V of the switching circuit 47, and to a phase comparator 53 through a variable frequency divider 52. The oscillator 48 and the frequency divider 51 constitute a first oscillator circuit, and the oscillator 49 and the frequency divider 50 constitute a second oscillator circuit.

The phase comparator 53 constitutes a known phase locked loop (PLL) together with a voltage controlled oscillator (VCO) 54 and a variable frequency divider 55. An output signal of the VCO 54 is supplied to the phase comparator 53 through the variable frequency divider 55, and to the terminal V of the switching circuit 46. When the disc 34 is one of the first through fourth discs described before, the switching circuits 46 and 47 are controlled to selectively produce the input signals to the respective terminals V as described before. Thus, the output signal of the VCO 54 is supplied to a digital signal demodulating circuit 56 as a master clock signal, from the switching circuit 46. At the same time, the output signal of the frequency divider 51, having the horizontal scanning frequency of 15.734 kHz, is supplied through the pin terminals $44_7$ and $43_7$ to a switching circuit 57 within the player part 35 as an external motor rotation synchronizing signal, from the switching circuit 47.

For example, the frequency of the master clock signal is selected to a frequency which is 140 times the transmission frequency (words transmitted per second) of the digital signals which are reproduced from the digital recorded tracks on the disc 34. Accordingly, in a case where the disc 34 is the disc 22 (first disc) having the NTSC system color video signal converted into a predetermined signal format and then recorded on the analog recorded tracks thereon at a rate of four fields in one revolution of the disc, 2940 blocks are recorded on the digital recorded tracks thereon with the transmission frequency of 44.056 kHz in one revolution of the disc. Hence, in this case, the frequency dividing ratio of the variable frequency divider 52 is controlled to "1" (unity) responsive to the output of the status decoding circuit 45, and further, the frequency dividing ratio of the variable frequency divider 55 is controlled to 1/392. Hence, a signal having a frequency of 6.1678 MHz is obtained from the VCO 54, and this signal is supplied to the digital signal demodulating circuit 56 through the switching circuit 46 as the master clock signal. On the other hand, when the disc 34 is the disc 31 (second disc) having the PAL or NTSC system composite video signal employing 625 scanning lines converted into a predetermined signal format and then recorded on the analog recorded tracks thereon at a rate of four fields in one revolution of the disc, 3528 blocks are recorded on the digital recorded tracks thereon with the transmission frequency of 44.100 kHz in one revolution of the disc as described before.

In the present embodiment, the rotational speed of the motor 38 is controlled so that the second disc can be played satisfactorily on a monitoring reproducing apparatus of the NTSC standard, that is, so that the recorded horizontal scanning frequency of 15.625 kHz is reproduced at the NTSC system horizontal scanning frequency of 15.734 kHz which is 144/143 times the recorded horizontal scanning frequency of 15.625 kHz. Thus, the motor 38 is not rotated at the rotational speed of 750 rpm but at a rotational speed of 755.24 (=750×144/143) rpm. For this reason, the transmission frequency of the digital signals which are reproduced from the digital recorded tracks on this second disc is not 44.100 kHz, but is 44.408 kHz (=44.1×144/143) kHz. Accordingly, the frequency dividing ratio of the variable frequency divider 52 is controlled to 1/125 in this case, while the frequency dividing ratio of the variable frequency divider 55 is controlled to 1/49392. Therefore, when playing the second disc, a signal having a frequency of 6.217 MHz which is 49392/125 times the horizontal scanning frequency of 15.734 kHz, that is, 140 times the transmission frequency of 44.408 kHz, is produced from the VCO 54. This signal from the VCO 54 is supplied to the digital signal demodulating circuit 56 through the switching circuit 46, as the master clock signal.

Next, description will be given with respect to the switching circuit 57. The switching circuit 57 is designed to selectively produce the signal having the horizontal scanning frequency $f_H$ when this signal is applied to the pin terminal 43₇, and to selectively produce the signal which has the horizontal scanning frequency $f_H$ and is produced from an oscillator 58 only when the above signal is not applied to the pin terminal 43₇ FIG. 13 is a circuit diagram showing an embodiment of the switching circuit 57. In FIG. 13, the pin terminal 43₇ is coupled to a rectifying and smoothing circuit through an inverter 91. This rectifying and smoothing circuit comprises a capacitor 92, diodes 93 and 94, a capacitor 95, and a resistor 96. On the other hand, the pin terminal 43₇ is also coupled to one input terminal of a 2-input AND circuit 100. An output of the rectifying and smoothing circuit is coupled to one input terminal of a 2-input AND circuit 98 through an inverter 97. An input terminal 90 is coupled to the other input terminal of the AND circuit 98. The output of the rectifying and smoothing circuit is also coupled to the other input terminal of the AND circuit 100, through the inverter 97 and an inverter 99. Output terminals of the AND circuits 98 and 100 are respectively coupled to respective input terminals of a 2-input OR circuit 101, and an output of this OR circuit 101 is coupled to an output terminal 102.

In the switching circuit 57 having the circuit construction shown in FIG. 13, the signal from the oscillator 58 within the player part 35, having the frequency which is equal to the horizontal scanning frequency of 15.734 kHz, is constantly applied to the input terminal 90 and is therefore supplied to the AND circuit 98. When the signal which has the frequency equal to the horizontal scanning frequency of 15.734 kHz and is generated within the adapter part 36 as described before, is applied to the pin terminal 43₇ as an external input signal, this external input signal is converted into a D.C. voltage by being passed through the inverter 91 and the rectifying circuit. The polarity of this D.C. voltage is inverted into a low-level signal in the inverter 97, and the output of the inverter 97 is supplied to the AND circuit 98. On the other hand, the output of the inverter 97 is inverted into a high-level signal in the inverter 99, and the output of this inverter 99 is supplied to the AND circuit 100. Accordingly, the output of the AND circuit 100 constantly assumes a low level. The output of the inverter 90, having the inverted phase of the external input signal applied to the pin terminal 43₇, is obtained through the AND circuit 100, the OR circuit 101, and then the output terminal 102, as the motor rotation synchronizing signal.

On the other hand, when no signal is applied to the input terminal 43₇ (such as a case where the player part 35 is coupled to a personal microcomputer, a case where a power source of the adapter part 36 is not ON, or the like), the voltage across the resistor 96 assumes a low level. Hence, a high-level signal is applied to one input terminal of the AND circuit 98 from the inverter 97, and a low-level signal is applied to one input terminal of the AND circuit 100 from the inverter 99. As a result, the output of the AND circuit 100 constantly assumes a low level, and the output of the AND circuit 98 becomes the output signal of the oscillator 58 which is obtained through the input terminal 90. Thus, this output signal of the oscillator 58 is passed through the OR circuit 101 and is produced through the output terminal 102.

Returning to the description of FIG. 10, the signal from the pin terminal 43₇ which is supplied to the switching circuit 57, is then frequency-divided by 1/21 in a frequency divider 59. A frequency divided output signal of the frequency divider 59 is supplied to a terminal N of a switching circuit 61. The output signal of the switching circuit 57 is also supplied to a frequency divider 60 wherein the signal is frequency-divided by 1/25. An output signal of the frequency divider 60 is supplied to a terminal P of the switching circuit 61. The switching of the switching circuit 61 is controlled in response to the signal which is obtained through the input terminal 42. The switching circuit 61 is connected to the terminal N when the disc being played is the first, third, or fifth disc. On the other hand, the switching circuit 61 is connected to the terminal P when the disc being played is the second or fourth disc. An output signal of the switching circuit 61 is supplied to a comparator 62 as a reference signal for the servo circuit of the motor 38. The comparator 62 compares the phases of the output signal of the switching circuit 61 with an output pulse of a magnetic detector 63.

A rotary shaft 64 of the motor 38 is fixed with a gear wheel 65. The gear wheel 65 comprises 50 teeth, for example, on the outer peripheral surface thereof at equal angular intervals. The magnetic detector 63 is located at a position where the magnetic detector 63 opposes the teeth of the gear wheel 65 over a small distance. As the motor 38 rotates, the turntable 37 rotates unitarily with the motor 38. Hence, the disc 34 which is placed on the turntable 37 and the gear wheel 65 respectively rotate. Every time the teeth of the gear wheel 65 passes by the magnetic detector 63, one pulse is produced from the magnetic detector 63 and supplied to the comparator 62.

In a case where the disc 34 is the first or third disc, the NTSC system color video signal having 525 scanning lines is converted into a predetermined signal format and is pre-recorded on the analog recorded tracks at the rate of four fields in one revolution of the disc. This means that 1050 scanning lines are recorded on the analog recorded track in one revolution of the disc. Hence, 21 scanning lines are reproduced every time one pulse is produced from the magnetic detector 63. For this reason, when playing the first or third disc, the output pulse of the frequency divider 59 which has a period which is 21 times the horizontal scanning period (1H) and is obtained from the switching circuit 61, and the pulse from the magnetic detector 63 having a period of 21H, are respectively supplied to the comparator 62. The comparator 62 produces an error voltage which is dependent on the phase error between the signals supplied thereto, and this error voltage is applied to the motor 38 through a motor driving amplifier 66.

On the other hand, in a case where the disc 34 is the second or fourth disc, the PAL or SECAM system color video signal is converted into the same predetermined signal format as the pre-recorded signals on the first and third discs and is pre-recorded on the analog recorded tracks at the rate of four fields in one revolution of the disc. This means that 1250 scanning lines are recorded on the analog recorded track in one revolution of the disc. Hence, 25 scanning lines are reproduced every time one pulse is produced from the magnetic detector 63. For this reason, when playing the second or fourth disc, the output pulse of the frequency divider 60 which has a period which is 25 times the horizontal scanning period (1H) and is obtained from the switching circuit 61 which is connected to the terminal P, and the pulse from the magnetic detector 63 having a period of 25 H, are respectively supplied to the comparator 62. The comparator 62 produces an error voltage which is dependent on the phase error between the signals supplied thereto, and this error voltage is applied to the motor 38 through the motor driving amplifier 66.

Accordingly, the motor 38 is controlled so that the horizontal scanning frequency is reproduced from the disc 34 at a frequency (15.734 kHz) which is the same as the frequency of the signal supplied to the frequency dividers 59 and 60. As a result, the motor 38 and the disc 34 are rotated at a rotational speed of 899.1 rpm in the case where the disc 34 is the first or third disc, and the motor 38 and the disc 34 are rotated at a rotational speed of 755.24 rpm which is 144/143 times the regular rotational speed of 750 rpm in the case where the disc 34 is the second or fourth disc.

When the operator pushes a start switch of the input device 39 after the motor 38, the turntable 37, and the disc 34 have started to rotate, a signal which causes the feed mechanism 67 to move in the inner peripheral direction of the disc 34 is produced through the command processor 40 and the microprocessor 41. The reproducing stylus 68 which is fed by the feed mechanism 67, thereafter makes sliding contact with disc 34. The disc 34 has an electrode function, and an electrode is formed on the reproducing stylus 68. Thus, an electrostatic capacitance is formed between the disc 34 and the electrode of the reproducing stylus 68, and this electrostatic capacitance varies according to variations in the geometrical configuration of the recorded tracks. The variations in the electrostatic capacitance is picked up and converted into an electrical signal according to a known method in a pickup circuit 69.

The reproduced signal (RF signal) obtained from the pickup circuit 69, is supplied to a known tracking servo circuit 70. The tracking servo circuit 70 discrimnates and separates the reference signals fp1 and fp2, detects the envelopes of the reference signals fp1 and fp2, and differentially amplifies the detected envelopes so as to produce a tracking error signal. The tracking error signal is applied to a tracking coil 71 which controls the reproducing stylus 68 so that the reproducing stylus 68 constantly scans over the recorded track without tracking error. As a result, the stylus tip of the reproducing stylus 68 is minutely displaced in the width direction of the track, instant by instant, depending on the tracking error.

The reproduced signal from the pickup circuit 69 is supplied to an information signal reproducing circuit 85. The reproducing circuit 85 frequency-demodulates the second FM signal which is reproduced from the analog recorded tracks, so as to obtain the composite video signal which is in conformance with the NTSC system and the audio signal. The reproduced composite video signal is produced through an output terminal 86, and the reproduced audio signal is produced through an output terminal 87.

Further, the reproduced signal from the pickup circuit 69 is supplied to a demodulator 72 within the adapter part 36, through the pin terminals $43_2$ and $44_2$. The demodulator 72 frequency-demodulates the reproduced signal, and supplies a demodulated signal to a vertical synchronizing signal detecting circuit 73, an address data write-in circuit 74, and the digital signal demodulating circuit 56. As described before, the master clock signal obtained from the switching circuit 46 and having the frequency of 6.1678 MHz, is supplied to the digital signal demodulating circuit 56, and the digital signal demodulating circuit 56 detects the existence of an error by use of the error detecting code CRC within the demodulated digital signal which is reproduced from the digital recorded tracks and has the signal format shown in FIG.2. When it is detected that the error does exist within the demodulated digital signal, the digital signal demodulating circuit 56 corrects the error by use of the error correcting codes P and Q. Further, the digital signal demodulating circuit 56 supplies the digital audio signals which are transmitted in the positions Ch-1 through Ch-4 shown in FIG.2, to a digital-to-analog (D-A) converter and switching device 75. On the other hand, in the case where the digital video signal is transmitted in at least one of the positions Ch-3 and Ch-4 shown in FIG.2, the digital signal demodulating circuit 56 supplies the digital video signal to a still picture decoder 76. The D-A converter and switching device 75 subjects the digital audio signals to a digital-to-analog conversion, and is switched and controlled in response to an output of an address data write-in circuit 77.

The still picture decoder 76 produces an analog video signal of the desired standard television system, related to the original still picture, from the digital video signal which is supplied thereto. This analog video signal from the still picture decoder 76 is produced through an output terminal 78. The address data write-in circuit 77 writes therein the address data of the address signal having the signal format shown in FIG.3, by storing the 1-bit signal which is located at the position Adr shown in FIG.2 and is obtained from each block. The address data written in the address data write-in circuit 77, is supplied to a terminal D of a switching circuit 79, and to the D-A converter and switching device 75. The D-A converter and switching device 75 produces a switching signal based on the address data from the address data write-in circuit 77, produces only the audio signals through two or more output terminals among output terminals 80 through 83. In other words, when a 4-channel audio signal is reproduced from the disc 34, the audio signals of the four channels are produced through all of the output terminals 80 through 83. When a 3-channel audio signal is reproduced from the disc 34, the audio signals of the three channels are produced through the output terminals 80 through 82. Further, when two kinds of 2-channel audio signals are reproduced from the disc 34, the audio signals of the two channels in one selected kind of 2-channel audio signal are produced through the output terminals 80 and 81 (or 82 and 83).

The address data write-in circuit 74 discriminate and separates the address signal within the signal which is reproduced from the analog recorded tracks, and writes therein the address data of the separated address signal. The written address data is applied to a terminal AN of the switching circuit 79. The vertical synchronizing signal detection signal from the vertical synchronizing signal detecting circuit 73, and the detection signal from the digital signal demodulating circuit 56 indicating the error detection result by the use of the error detecting code CRC, are respectively supplied to a discriminating circuit 84. In a duration in which the vertical synchronizing signal detection signal is not supplied to the discriminating circuit 84 and the detection signal supplied to the discriminating circuit 84 from the digital signal demodulating circuit 56 indicates that there is no error, the discriminating circuit 84 discriminates that the digital recorded track is being reproduced and connects the switching circuit 79 to the terminal D. On the other hand, in a duration in which the vertical synchronizing signal detection signal is supplied to the discriminating circuit 84 and the detection signal supplied to the discriminating circuit 84 from the digital signal demodulating circuit 56 indicates that there is an error, the discriminating circuit 84 discriminates that the analog recorded track is being reproduced and connects the switching circuit 79 to the terminal AN.

Accordingly, the output address data of the address data write-in circuit 74 is obtained from the switching circuit 79 while the analog recorded track is being reproduced. On the other hand, the output address data of the address data write-in circuit 77 is obtained from the switching circuit 79 while the digital recorded track is being reproduced. The reproduced address data obtained from the switching circuit 79, is supplied to the command processor 40 and the microprocessor 41 within the player part 35, through the pin terminals $44_1$ and $43_1$. The command processor 40 constantly displays the position of the reproducing stylus 65 with the address data which is designated. The microprocessor 41 produces various kinds of signals based on the signals from the input device 39 and the input address data, and supplies the various kinds of signals to the feed mechanism 64. For example, during a random access, the reproducing stylus 65 is moved at a high speed to the track position having the address which is designated by the input device 39.

Hence, even in the case where the disc 34 is the disc 22 on which the digital recorded tracks and the analog recorded tracks coexist, it is possible to satisfactorily reproduce the signals from the recorded tracks on the disc 34. In a case where the disc 34 is the conventional digital audio disc (fifth disc) comprising solely of the digital recorded tracks, the switching circuits 46 and 47 are connected to the respective terminals A in response to the output signal of the status decoding circuit 45. In this case, the output signal of the oscillator 49 having the frequency of 6.174 MHz, is produced from the switching circuit 46 and is supplied to the digital signal demodulating circuit 56 as the master clock signal. In addition, the output signal of the frequency divider 50 having the frequency of 15.75 kHz, is produced from the switching circuit 47 and is supplied to the frequency dividers 59 and 60 as the motor rotation synchronizing signal, through the pin terminals $44_7$ and $43_7$ and the switching circuit 57.

In a case where the disc 34 being played is the fifth disc, the switching circuit 61 is connected to the terminal N. Hence, the signal which is frequency-divided by 1/21 in the frequency divider 59 and has the frequency of 750 Hz, is supplied to the comparator 62. As a result, the motor 38 is rotated at a rotational speed of 900 rpm. In addition, when playing the fifth disc, the switching circuit 79 is constantly connected to the terminal D. The switching circuit 79 is constantly connected to the terminal AN when playing the video disc (second or fourth disc).

When reproducing the analog recorded tracks, the reproducing stylus 68 is minutely displaced in the track scanning direction, instant by instant, so as to compensate for the jitter during the reproduction as is well known. On the other hand, the jitter in the digital signals which are reproduced from the digital recorded tracks, can be compensated in the digital signal demodulating circuit 56. Hence, it is unnecessary to minutely displace the reproducing stylus 68 in the track scanning direction while reproducing the digital recorded tracks. Therefore, the operation of minutely displacing the reproducing stylus 68 in the track scanning direction so as to compensate for the jitter in the reproduced signals, is carried out depending on the kind of recorded track which is being reproduced. The output signal of the vertical synchronizing signal detecting circuit 73 may be used as a signal for activating and deactivating a displacing mechanism (not shown, and including a jitter compensation coil and the like) which displaces the reproducing stylus 65 in the track scanning direction.

However, the jitter compensating operation may be carried out regardless of whether the analog recorded track or the digital recorded track is being reproduced. In such a case it is possible to displace the reproducing stylus 68 in the track scanning direction so that the reference signals fp1 and fp2 are reproduced with a period of 1 H, by noting that the reference signals fp1 and fp2 are recorded on the disc with the period of 1 H.

In the embodiment described heretofore, it was described that the reproducing apparatus controls the rotational speed of the disc so that the horizontal scanning frequency is reproduced with the frequency of 15.734 kHz, so that the four kinds of discs (first through fourth discs) at least having the analog recorded tracks can be played by the reproducing apparatus and displayed on a monitoring television receiver which is designed for the system employing 525 scanning lines. However, the present invention can of course be applied to a reproducing apparatus which controls the rotational speed of the disc so that the discs can be played by the reproducing apparatus and displayed on a monitoring television receiver which is designed for the system employing 625 scanning lines. In this case, however, the oscillator 48 and the frequency divider 51 must produce a signal having a frequency which is equal to the horizontal scanning frequency of 15.625 kHz, and the oscillation frequency of the oscillator 58 must be changed to 15.625 kHz.

The following table shows the rotational speed of the motor 38 (disc 34), the transmission frequency of the digital signals (blocks) reproduced from the digital recorded tracks, the master clock signal frequency, and the frequency dividing ratio of the variable frequency divider 55 for the cases where the first through fifth discs are played.

TABLE

| Type of disc | Rotational speed (rpm) | Transmission frequency (kHz) | Master clock signal frequency (MHz) | Frequency dividing ratio of frequency divider 55 |
|---|---|---|---|---|
| 1st | 892.86 | 43.750 | 6.125 | 1/392 |
| 2nd | 750.00 | 44.100 | 6.174 | 1/49392 |
| 3rd | 892.86 | — | — | — |
| 4th | 750.00 | — | — | — |
| 5th | 900.00 | 44.100 | 6.174 | — |

As may be seen from the table above, the master clock signal frequency is equal to 140 times the transmission frequency. However, in the reproducing apparatus according to the present invention, the master clock signal frequency does not have to be equal to 140 times the transmission frequency, and may be other real number multiples of the transmission frequency. In the table, the designations "1st", "2nd", "3rd", "4th", and "5th" respectively indicate the first through fifth discs described before. The frequency dividing ratio of the variable frequency divider 52 is switched over to "1" when playing the first disc, and to "1/125" when playing the second disc.

The reproducing apparatus according to the present invention can play the disc which is pre-recorded on the analog recorded tracks thereof with N fields of composite video signal, where N is a natural number greater than or equal to 2. Hence, the number of fields recorded in one revolution of the disc is not limited to four.

Further, the adapter part 36 and the player part 35 are provided independently in the embodiment described heretofore, however, the adapter part 36 may be built within the player part 35. In addition, when an external device such as a microcomputer which has a discriminating function is coupled to the player part 35, the clock signal from the microprocessor 41 is supplied to this external device through the pin terminal 43$_{51}$. At the same time, when an address data is supplied to the external device, the external device produces a command signal every time the address data is supplied thereto. This command signal from the external device is supplied to the command processor 40 through the pin terminal 43$_{4}$. Accordingly, it is possible to control the operation of the disc reproducing apparatus by the external device.

It was described heretofore that the disc reproducing apparatus according to the present invention can compatibly play the existing digital audio disc and the existing video disc. However, the disc reproducing according to the present invention may also play an optical type disc from which the recorded information is read by the use of a light beam. The present invention may of course play a disc of the type which is not recorded with the reference signals fp1 through fp3. Moreover, as proposed in a U.S. patent application Ser. No. 574,521 in which the assignee is the same as the assignee of the present application, the information signal which is recorded on the disc which is played by the disc reproducing apparatus according to the present invention, may also include a program for carrying out an interactive control between the disc reproducing apparatus and an external device such as a personal microcomputer having a discriminating function.

The information signal recorded on the digital recorded tracks may be an information signal (a video signal, for example) which is other than the audio signal, in all of the four channels. For example, a video signal may be recorded in all of the four channels, to record on the disc the contents of an encyclopedia, a telephone directory, and the like.

Further, the present invention is not limited to these embodiments, but various variations and modifications may be made without departing from the scope of the present invention.

What is claimed is:

1. A rotary recording medium reproducing apparatus for reproducing pre-recorded signals from a rotary recording medium on which information signals are recorded on a spiral track or concentric tracks thereof, said reproducing apparatus comprising:
   reproducing means for picking up and reproducing said pre-recorded signals from a rotary recording medium having digital track turns which are recorded with a first modulated signal and analog track turns which are recorded with a second modulated signal, said digital track turns and analog track turns constituting either a spiral track or concentric track turns, said first modulated signal being a digital signal which comprises modulated time-sequentially multiplexed blocks of digital data, said blocks of digital data being transmitted at a transmission frequency of 44.1 kHz or the transmission frequency extremely close to 44.1 kHz, each of said blocks of digital data comprising a synchronizing signal, error correcting codes, an error detecting code, and digitally modulated information signals of a plurality of channels, said second modulated signal being an analog modulated analog information signal at least including a composite video signal;
   a first reproducing circuit for reproducing a composite video signal having a horizontal scanning frequency of a predetermined television system from signals which are reproduced from said analog track turns, among reproduced signals from said reproducing means;

a second reproducing circuit for demodulating and reproducing original information signals from signals which are reproduced from said digital track turns, among the reproduced signals from said reproducing means;

a first oscillator circuit for producing a signal having a frequency which is equal to a natural number times the horizontal scanning frequency of said predetermined television system;

a servo circuit supplied with an output signal of said first oscillator circuit as a motor rotation synchronizing signal, for rotating a motor in synchronism with said motor rotation synchronizing signal, said motor rotating said rotary recording medium; and clock signal generating circuit for frequency-multiplying the output signal of said first oscillator circuit, and for supplying the frequency multiplied signal to said second reproducing circuit as a clock signal.

2. A reproducing apparatus as claimed in claim 1 which further comprises a second oscillator circuit for producing a signal having a specific constant frequency, first switching circuit means for selectively supplying a signal depending on whether the rotary recording medium being played is a first rotary recording medium on which said digital track turns and said analog track turns coexist, a second rotary recording medium having only said analog track turns, and a third rotary recording medium having only said digital track turns, said first switching circuit means selectively supplying an output signal of said clock signal generating circuit to said second reproducing circuit when said first rotary recording medium is being played and selectively supplying an output signal of said second oscillator circuit to said second reproducing circuit as the clock signal when said third rotary recording medium is being played, and second switching circuit means for selectively supplying the output signal of said first oscillator circuit to said servo circuit as said motor rotation synchronizing signal when said first or second rotary recording medium is being played, and for selectively supplying a predetermined signal to said servo circuit as said motor rotation synchronizing signal when said third rotary recording medium is being played, said predetermined signal being obtained by frequency-dividing the output signal of said second oscillator circuit.

3. A reproducing apparatus as claimed in claim 2 which further comprises a third oscillator circuit for producing a signal having a frequency which is equal to the horizontal scanning frequency of said predetermined television system, and third switching circuit means supplied with output signals of said third oscillator circuit and said second switching circuit means, said third switching circuit means selectively supplying the output signal of said second switching circuit means unchanged to said servo circuit as said motor rotation synchronizing signal in a duration in which the output signal of said second switching circuit means is obtained, and selectively supplying the output signal of said third oscillator circuit to said servo circuit as said motor rotation synchronizing signal in a duration in which the output signal of said second switching circuit means is not obtained.

4. A reproducing apparatus as claimed in claim 2 which further comprises rotation control means for controlling a rotational speed of said rotary recording medium so that a reproduced horizontal scanning frequency within the signals which are reproduced from said analog track turns coincides with the horizontal scanning frequency of said predetermined television system, by selectively supplying to said servo circuit a signal which is obtained by frequency-dividing said motor rotation synchronizing signal with a frequency dividing ratio which is dependent on a number of scanning lines employed in said composite video signal recorded on said analog track turns.

5. A reproducing apparatus as claimed in claim 4 in which said rotation control means selectively supplies to said servo circuit a signal which is obtained by frequency-dividing said motor rotation synchronizing signal with a predetermined frequency dividing ratio when reproducing the pre-recorded signals from said third rotary recording medium, said predetermined frequency dividing ratio being the same as the frequency dividing ratio with which said motor rotation synchronizing signal is frequency-divided when reproducing the pre-recorded signals from said first or second rotary recording medium which is recorded with said composite video signal employing the same number of scanning lines as said predetermined television system.

6. A reproducing apparatus as claimed in claim 1 which further comprises a first address signal write-in circuit for writing therein an address signal which is reproduced from said analog track turns among the reproduced signals from said reproducing means, a second address signal write-in circuit for writing therein an address signal which is reproduced from said digital track turns among the signals which are reproduced in said second reproducing circuit, discriminating means for making a discrimination to determine whether the track turn being reproduced by said reproducing means is said analog track turn or said digital track turn, said discrimination being made based on an output signal of a detecting circuit which detects a vertical synchronizing signal in the reproduced signals from said reproducing means and on an error detection result which is obtained in said second reproducing circuit based on said error detecting code, and fourth switching circuit means responsive to an output signal of said discriminating means, for selectively producing an output signal of said first address signal write-in circuit when reproducing the pre-recorded signals from said analog track turns, and selectively producing an output signal of said second address signal write-in circuit when reproducing the pre-recorded signals from said digital track turns.

7. A reproducing apparatus as claimed in claim 1 in which said reproducing apparatus is divided into a player part which comprises at least said reproducing means, said first reproducing circuit, and said servo circuit and an adapter part which comprises said second reproducing circuit, said first oscillator circuit, and said clock signal generating circuit, and said adapter part is coupled to said player part through a connector.

8. A reproducing apparatus as claimed in claim 2 in which said clock signal generating circuit generates a signal having a first frequency when playing a rotary recording medium having said analog track turns recorded with a composite video signal employing 525 scanning lines, said first frequency being M times the transmission frequency of said digital signals which are reproduced from said digital track turns, where M is a real number, and said clock signal generating circuit generates a signal having a second frequency when playing another rotary recording medium having said analog track turns recorded with a composite video signal employing 625 scanning lines, said second frequency being different from said first frequency and being M times the transmission frequency of the digital signals which are reproduced from said digital track turns.

* * * * *